UNITED STATES PATENT OFFICE 2,659,741

11-KETO-17 ALPHA-PROGESTERONE

Herbert C. Murray, Hickory Corners, and Durey H. Peterson, Kalamazoo, Mich., assignors to The Upjohn Company, Kalamazoo, Mich., a corporation of Michigan No Drawing. Application July 1, 1952, Serial No. 296,724

1 Claim. (Cl. 260—397.3)

This invention relates to 11-keto-17α-progesterone.

The compound of the present invention represented by the formula:

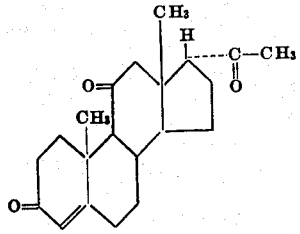

is prepared by oxidation of starting 11α-hydroxy-17α-progesterone (11α-hydroxy-17-isoprogesterone). The starting compound 11α-hydroxy-17α-progesterone is prepared by subjecting 16-dehydroprogesterone to the oxygenating action of a culture of fungus of the order Mucorales as described in our applications, Serial No. 180,496, filed August 19, 1950, now abandoned, and Serial No. 272,944, filed February 23, 1952, issued July 8, 1952 as Patent No. 2,602,769, of which the present application is a continuation-in-part.

It is an object of the present invention to provide the novel 11-keto-17α-progesterone. Other objects will be apparent to one skilled in the art to which the invention pertains.

The compound of the present invention has pharmacological activity per se and is additionally useful as a chemical intermediate. It exhibits inhibitory properties in glucocorticoid, estrogenic, folliculoid, testoid, spermatogenic, renotropic, hypertensive, salt retention, luteoid, and progesterone activities. The 11-keto-17α-progesterone may be readily converted to the physiologically active 11-ketoprogesterone by mutorotation with alkali, or acid, for example alcoholic hydrochloric acid.

In the process of the present invention the starting 11α-hydroxy-17α-progesterone is dissolved in a solvent such as, for example, glacial acetic acid, and oxidized with a suitable oxidizing agent such as, for example, potassium permanganate, N-bromosuccinimide, chromic acid, chromium trioxide, and others. The oxidizing agent is usually used in a proportion of about one equivalent per mole of steroid although other proportions are within the scope of the present invention. The oxidization is usually conducted at about room temperature, although other temperatures between about zero degrees centigrade and the boiling point of the reaction mixture may also be employed. The reaction time may be varied with the oxidizing agent and the temperature employed. The solvent may then be removed by distillation under reduced pressure and the product precipitated by the addition of water which concomitantly dissolves any inorganic salts present. The resulting 3-keto-17α-progesterone may then be purified, filtered, and recrystallized from a suitable solvent, such as, for example, acetone, or by chromatographic separation according to methods known in the art.

The following examples are illustrative of the process and products of the present invention, but are not to be construed as limiting.

PREPARATION 1.—11α-HYDROXY-17α-PROGESTERONE

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. Two liters of this sterilized medium was inoculated with Rhizopus nigricans ATCC 6227b, and incubated for 24 hours at a temperature of 28 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem., 36, 504 (1944). To this medium containing a 24 hour growth of Rhizopus nigricans was added one gram of 16-dehydroprogesterone in 25 milliliters of acetone to provide a suspension of the steroid in the culture. After an additional 24 hour period of incubation under the same conditions of temperature and aeration, the beer containing mycelium was extracted twice with one liter portions of methylene chloride and twice with 500-milliliter portions of methylene chloride. The extract was washed twice with 250 milliliters of five percent sodium bicarbonate and twice with 250 milliliters of water. After drying over anhydrous sodium sulfate, filtering and evaporating the solvent, a semi-crystalline residue of 2.045 grams was obtained. This residue was dissolved in fifty milliliters of benzene and chromatographed over 100 grams of alumina (hydrochloric acid washed and activated by heating at 120 degrees centigrade for four hours). Developing solvents were added to the column in 180-milliliter portions as given in the table.

TABLE

| Fraction | Solvent | Eluate Solids, Milligrams |
|---|---|---|
| 1, 2 | benzene | 166.0 |
| 3, 4 | benzene plus 20 percent ether | 140.5 |
| 5, 6 | benzene plus 50 percent ether | 9.0 |
| 7, 8 | ether | 10.0 |
| 9, 10 | ether plus 5 percent chloroform | 23.0 |
| 11, 12 | ether plus 10 percent chloroform | 33.5 |
| 13, 14 | ether plus 50 percent chloroform | 85.0 |
| 15–17 | chloroform | 658.0 |
| 18, 19 | chloroform plus 10 percent acetone | 113.0 |
| 20, 21 | chloroform plus 50 percent acetone | 72.5 |
| 22, 23 | acetone | 61.0 |
| 24 | methanol | 106.0 |

Fractions 5 through 13, inclusive, were combined and recrystallized from two milliliters of acetone to give fifty milligrams of starting material, melting point 184 to 189 degrees centigrade. Fractions 14 through 17, inclusive, were combined and dissolved in 0.5 milliliter of methylene chloride. To this solution, five milliliters of ether was added to cause crystallization at room temperature. Crystallization was completed by cooling the solution to zero degrees centigrade for two hours. The yellow supernatant liquid was decanted from the crystals which were then washed with five milliliters of ether to which a few drops of acetone was added. The product was recrystallized from one milliliter of methylene chloride to which ether was added until crystallization was effected. After two recrystallizations from methylene chloride with the addition of ether, 255 milligrams were obtained of colorless crystals of 11α-hydroxy-17α-progesterone, melting point 209 to 211.5 degrees centigrade, $[\alpha]_D^{23}$ of minus twelve degrees (0.995 in chloroform). Structure was confirmed by infrared and ultraviolet spectra.

*Analysis.*—Calculated for $C_{21}H_{30}O_3$: C, 76.32; H, 9.15. Found: C, 76.07; H, 9.07.

Example—11-keto-17α-progesterone

A solution of 45 milligrams of 11α-hydroxy-17α-progesterone in three milliliters of glacial acetic acid was prepared and cooled to five degrees centigrade whereafter a solution of twelve milligrams of chromium trioxide in 0.2 milliliter of water, and one milliliter of glacial acetic acid was added dropwise. The resulting solution was kept at room temperature for four hours, diluted with fifty milliliters of methanol and concentrated under reduced pressure. The green residue was taken up in fifty milliliters of water and 25 milliliters of ether and extracted with two additional 25-milliliter portions of ether whereupon the ether extracts were washed twice with ten milliliters of a fifty percent solution of sodium bicarbonate and three times with water. Drying over five grams of sodium sulfate and concentrating at room temperature produced forty milligrams of a crystalline residue having a melting point of 187 to 196 degrees centigrade. The product was recrystallized from 0.5 milliliter of acetone to which hexane was added dropwise and after two recrystallizations the compound had a melting point of 199 to 203.5 degrees centigrade. The optical rotation $[\alpha]_D^{23}$ was plus 45 degrees (0.699 in chloroform).

*Analysis.*—Calculated for $C_{21}H_{30}O_3$: C, 76.79; H, 8.59. Found: C, 76.64; H, 8.57.

We claim:

11-keto-17α-progesterone.

HERBERT C. MURRAY.
DUREY H. PETERSON.

No references cited.